United States Patent [19]
Crosby

[11] Patent Number: 4,760,684
[45] Date of Patent: Aug. 2, 1988

[54] BAGS

[75] Inventor: Denis G. Crosby, Greenwich, Conn.

[73] Assignee: Princeton Packaging, Inc., Greenwich, Conn.

[21] Appl. No.: 3,849

[22] Filed: Jan. 14, 1987

[51] Int. Cl.$^4$ .......................... B31B 1/64; B65B 43/04
[52] U.S. Cl. .......................................... 53/459; 53/384; 493/234; 493/926
[58] Field of Search .................... 53/385, 384, 459; 493/234, 233, 238, 226, 926, 197, 196, 195, 194, 193, 204

[56] References Cited

U.S. PATENT DOCUMENTS

| | | | |
|---|---|---|---|
| 3,194,124 | 7/1965 | Warp | 493/198 X |
| 3,197,936 | 8/1965 | Messmer | 53/385 X |
| 3,361,041 | 1/1968 | Grob | 493/226 X |
| 3,552,278 | 1/1971 | Guenther | 493/198 X |
| 3,779,449 | 12/1973 | Membrino | 53/385 X |
| 4,181,069 | 1/1980 | Porter | 493/233 X |
| 4,519,504 | 5/1985 | Nausedas | 53/385 X |
| 4,664,161 | 5/1987 | Sawa et al. | 493/239 X |

Primary Examiner—James F. Coan
Attorney, Agent, or Firm—Richards, Harris, & Medlock & Andrews

[57] ABSTRACT

An improved assembly of bags (70) is disclosed which forms individual bags (100) connected in a continuous assembly with a line of perforations (50) between each of the bags. The bag assembly (70) is particularly suitable for indexing before a packing machine (88) for packing the individual bags with the bags being separable by tearing each bag off the assembly at the line of perforations (50).

12 Claims, 2 Drawing Sheets

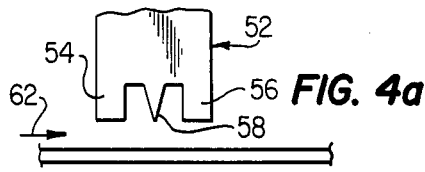
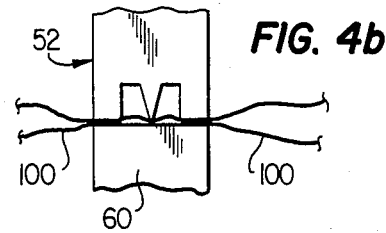
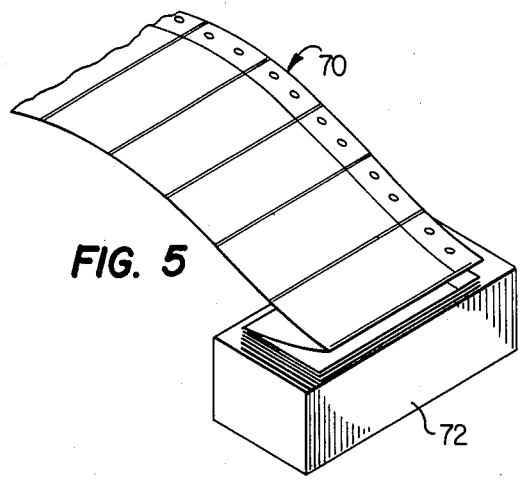
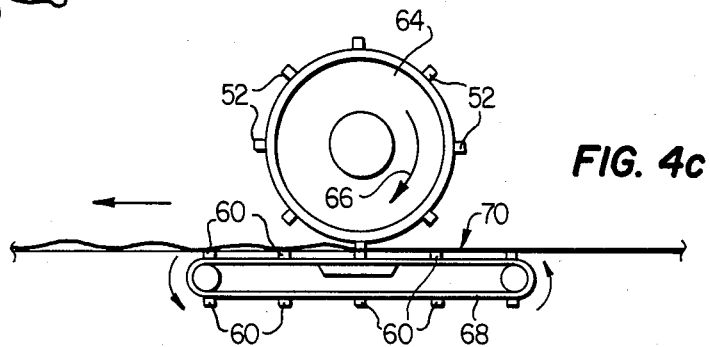
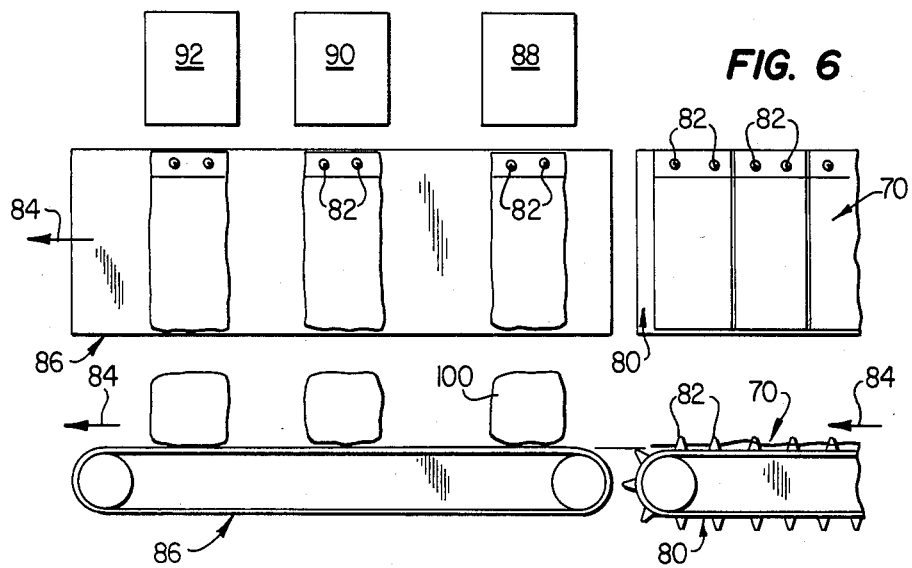

BAGS

TECHNICAL FIELD

This invention relates to the production of plastic bags and the packaging of product, such as bread, within the bags.

BACKGROUND OF THE INVENTION

Most bread sold on store shelves is packaged within a plastic bread bag. Typically, a supplier will manufacture the bags from a continuous sheet of plastic. The bags manufactured have an opening and a flap portion extending from the opening which includes side by side holes. The manufacturer puts the individual bags on a U shaped metal piece with each leg of the U shaped piece passing through a hole to form what is known as a wicket. Usually, 400 to 500 individual bags are positioned on a wicket. The wickets are then shipped to the baker.

The baker will take the individual wickets and position them on a bread bagging machine. The majority of bread in the U.S.A. is bagged on a machine manufactured by AM&F referred to as the "mark 50" machine ("50" meaning a capacity for bagging about 50 loaves a minute). The mark 50 is provided with an air supply which blows open the top bag of the wicket and inserts a shovel like device into the open end of the bag. A loaf of bread is then positioned in line with the open end of the bag and the shovel like structure tears the bag from the wicket and draws the bag over the bread until the bread is completely within the bag. The shovel like structure then releases the bag and the filled bag is transferred along the machine for tying the open end closed with a tie, commonly a wire tie or plastic tie.

The mark 50 machine relies heavily on each bag being held at both holes by the U shaped wicket piece as the bag is blown open by the air pressure. Clearly, if only one hole is properly mounted on a leg of the U shaped piece, the air pressure will simply blow the bag off the side of the wicket, causing a malfunction. An operator must be present to remedy such a malfunction caused by a "one holer" bag.

In response to the problem of one holer bags, bag manufacturers have attempted to design bag manufacturing devices which minimize the problem. Commonly, a rotating cylinder with arms extending radially outward from the cylinder, take the individual bags and hold them on the arms by air vacuum as the cylinder rotates. The cylinder rotates the individual bag onto the U shaped piece.

However, one holers continue to occur even with this device. Therefore, the operators of the machine must manually flip through the bags on a particular wicket in an attempt to find these one holers. Every one holer found is simply torn off the wicket, as it would be too expensive to properly place the bag on the wicket manually. As these bags are normally printed with the particular logo and information of the baker at the time of wicketing, the bags cannot be recycled into the plastic extruder and must simply be thrown away as scrap and, even after this labor intensive search, one holers still are sent to bakers, causing disruption of the bagging machines.

Thus, the present techniques for manufacturing bread bags and bagging bread have significant disadvantages. The manufacture of the bags involves labor intensive steps which still do not render the wickets shipped to the baker free from one holers. The present inability to eliminate one holers creates significant problems for the baker as the bread is being packaged, which reflects not only upon the efficiency of the baker's operation, but the baker's relationship with the bag manufacturer. Therefore, a need exists for an apparatus and method which overcomes these deficiencies in the present art.

Furthermore, the existing bag manufacturing systems are forced to operate at a speed which is slower than desirable because of the need to minimize the presence of one holers and to ensure proper separation of each individual bag. Also, the amount of labor required to assemble a wicket of bags is a significant disadvantage of existing manufacturing systems.

SUMMARY OF THE INVENTION

In accordance with one aspect of the present invention, an improved method for manufacturing a bag from a sheet is provided. The method includes the step of folding the sheet longitudinally off the center line of the sheet to define facing bag portions and a flap portion. The method includes the step of forming a pair of holes through the flap portion. The method further includes the step of bonding the facing bag portions of the sheet together transverse the length of the sheet at uniform spacing along the sheet with side seals and perforating the sheet between the side seals.

In accordance with a further method for bagging a product within the improved continuous sheet of bags, the method includes the step of indexing the individual bag sections with indexing structure extending through the pair of holes in the flap portion of each bag section to a loading machine for loading each bag with a product. The method further includes the step of accelerating the indexing structure indexing a bag relative to the adjacent bag to separate the bags along the line of perforations.

In accordance with another aspect of the present invention, an improved assembly of bags is provided. The assembly includes a plurality of discrete bags formed from a single sheet folded longitudinally off the center line of the sheet to define a flap portion for each bag. Each bag has a pair of holes through the flap portion, with each pair of holes aligned along a longitudinal direction relative to the sheet. The individual bags are sealed by side seals extending transverse the length of the sheet and a line of perforations is provided between the side seals of adjacent bags to facilitate removal of the individual bags from the assembly.

In accordance with another aspect of the present invention, structure is provided for indexing the bag assembly on a machine for packing individual products into each bag. The machine indexes individual bags to a structure for inserting a product within each bag and is provided with structure for accelerating the indexing structure of each bag relative to its adjacent bag to separate the bags along the perforation line.

In accordance with yet another aspect of the present invention, the improved method is provided for manufacturing bags from a sheet which eliminates the presence of one holers and the cost of wicket accessories. Further, the method of manufacture increases bag manufacturing speeds over that possible with prior designs and reduces the labor expense in bag manufacturing and product bagging. The method includes the formation of a string of connected bags which facilitates the sequential positioning of individual bags before a packing machine for packing each bag with product and also permits positioning before a device to heat seal the filled bags to provide a tamper evident feature.

BRIEF DESCRIPTION OF THE DRAWINGS

With reference now to the following Detailed Description, taken in conjunction with the accompanying Drawings, wherein:

FIGS. 4a, b and c illustrate proposed apparatus for forming the improved assembly of plastic bags;

FIG. 5 illustrates a shipping technique for the improved plastic bags;

FIG. 6 illustrates an apparatus for indexing the improved plastic bag assembly through various stages of loading, sealing and printing.

DETAILED DESCRIPTION

Figure 1A:
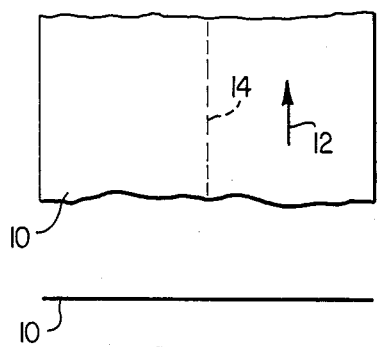
FIGS. 1a-c illustrate states in the formation of conventional plastic bags.

With reference now to the drawings, wherein like reference numerals designate like or corresponding parts throughout several views, the prior art and improvement of the present invention are illustrated.

Figure 1B:
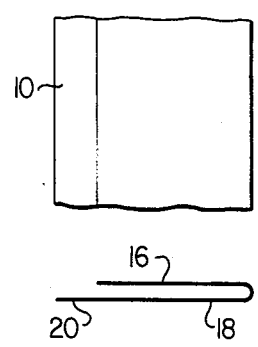
Figure 1C:
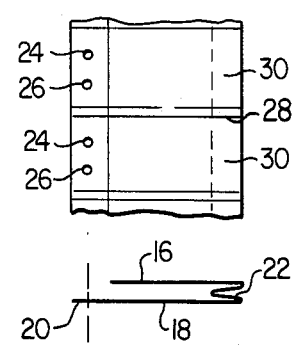
Figure 2A:
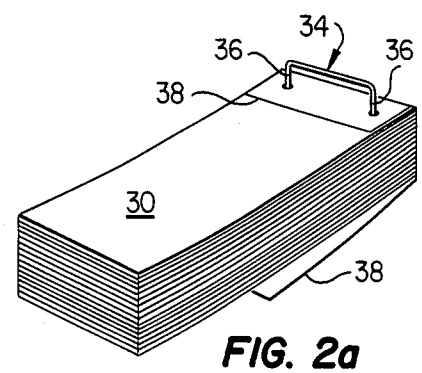
FIGS. 2a and b illustrate a conventional wicket.
Figure 2B:
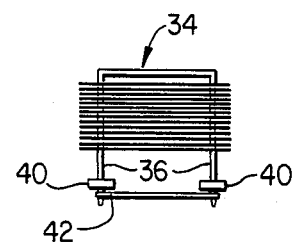
Figure 3A:
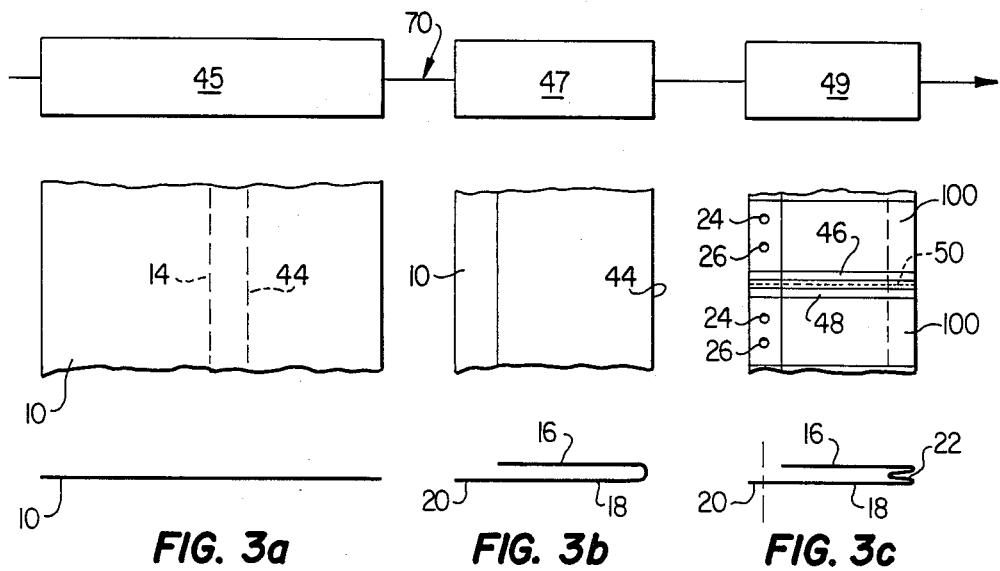
FIGS. 3a-c illustrate stages in the formation of a plastic bag assembly forming a first embodiment of the present invention.
Figure 3A:
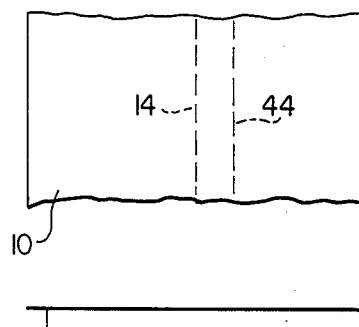
Figure 3B:
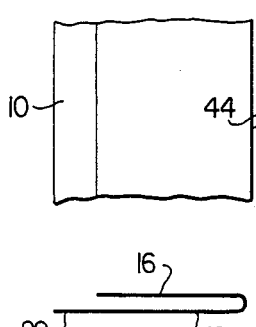
Figure 3C:
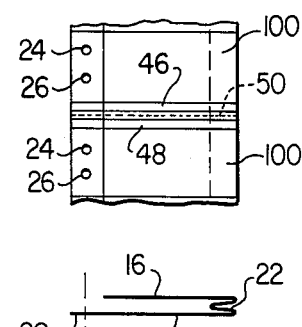

The prior art is illustrated in FIGS. 1 and 2. More particularly, FIGS. 1a-c illustrate the formation of a conventional bag 30 such as the type used for a bread wrap. A continuous sheet of plastic 10 of single thickness is used. Commonly, the sheet 10 has already been printed with the label information for the loaf of bread or the like in continuous, reoccurring patterns. The sheet is then folded along the longitudinal direction represented by arrow 12 offset from its center line 14. The folded sheet thus forms facing bag portions 16 and 18 with a flap portion 20 extending from one of the bag portions as best seen in FIG. 1b. A gusset 22 is formed opposite flap portion 20 and a pair of holes 24, 26 are punched through each flap portion 20 in a continuous line along the longitudinal length of the sheet. A heat bar is then employed to seal along transverse lines 28 to simultaneously form the sides of each separate bag 30 and separate the bags 30.

With reference to FIG. 2, the individual formed plastic bags 30 are then wicketed on wicket 32. The wicket 32 includes a U shaped piece 34 with parallel legs 36 which pass through the hole pairs 24 and 26 to hold each bag on the wicket. The section is typically sized to hold about 400 or 500 bags 30. Heavy paper covers 38 are placed on either side of the bags to resist tearing of the bags and rubber doughnuts 40 are placed on each leg and held in place by a rubber band 42 to hold the wicket together. The bag manufacturer boxes up a quantity of these wickets for shipment to the baker.

Machinery is usually employed to place each bag 30 on the legs of section 34. However, this process is not perfect, and one holers are often encountered. A one holer occurs when only one leg 36 passes through a hole in a bag 30. The operator of the bag making machine will typically flip through the bags on a wicket and remove any one holers found. These one holers are simply torn off the wicket and thrown away. Because the bags are usually already printed, the bags cannot be recycled into a sheet extrusion die for reuse and must simply be discarded. The plastic forming the bags 30 are the most expensive component in the entire process of bag manufacture, and the waste created by one holers is expensive to the manufacturer. Despite the most careful attention by the machine operator at the bag making factory, one holers will still exist in the wickets that leave the factory for the bakery. When mounted on a machine for bagging bread within the bags, the machine will malfunction when it encounters a one holer, causing the assembly process to be disturbed.

In accordance with the present invention, an improved technique for bag manufacture is illustrated in FIGS. 3a-c and FIGS. 4a-c. As in the prior art, a plastic sheet 10 is employed which is folded along longitudinal line 44 offset from the center line of the sheet 14 by device 45. The fold at the longitudinal line 44 forms the bottom of the bag eventually created, with facing bag portions 16 and 18. Again, a flap portion 20 extends from one of the bag portions. Holes 24 and 26 are formed in the flap portions 20 and gusset 22 is formed by device 47. To this point, the manufacture is similar to the past techniques.

However, the present invention then provides separate side seals 46 and 48 for adjacent bags with a line of perforations 50 extending between seals 46 and 48 with device 49. The seals 46 and 48 and line of perforations 50 each extend transverse to the longitudinal direction of the sheet and line 44. The resultant product is an assembly 70 of bags 100 which are connected together side by side in a length as long as desired.

With reference to FIG. 4a, a combination welder and perforator bar 52 can be used in device 49 to form the seals and line of perforations simultaneously. The bar 52 includes spaced apart heat bars 54 and 56 positioned on opposite sides of a perforator 58. The bar 52 is reciprocated toward and away from a bar 60. The sheet 10 is moved in an incremental manner in the direction of arrow 62 between the bars 52 and 60. Movement of the sheet 10 is halted for a sufficient period of time for the bars to move together and form seals 46 and 48 and line of perforations 50. The bars then move apart and the sheet 10 is moved an incremental distance which corresponds with the desired width of the finished bag.

The simultaneous sealing and perforation technique described with reference to FIGS. 4a and b is suitable for daption to a rotary system as illustrated in FIG. 4c. In the system of FIG. 4c, a rotating cylinder 64 rotates at a continuous angular velocity in the direction of arrow 66. A plurality of bars 52 are mounted on the outer surface of cylinder 64. A web 68 runs beside cylinder 64 with a linear speed equal to the speed of each bar 52. The plastic 10 is fed between the cylinder and web at a speed matching the speeds of the cylinder 64 and web 68. The welding and perforating operations are thus conducted with less delay between operations to increase the efficiency of bag manufacture. The web 68 can be provided with bars 60 positioned so that bars 52 and 60 are paired and face each other during the welding and perforating operation.

Rather than separating individual bags 100 and placing the bags on a wicket, as done in the prior art, the present invention contemplates placement of a bag assembly 70 within a container 72 for shipment to the bakery. Whereas prior wickets have been capable of containing only about 500 individual bags, each bag assembly 70 can theoretically comprise as many bags as desired in a continuous string, limited only by the size of the container 72.

With reference now to FIG. 6, a much improved packaging assembly line can be employed by the bakery using the bag assembly 70 formed in accordance with the teachings of the present invention. As seen in FIG. 6, the assembly line can include a supply belt 80 having paired hole engaging pins 82 on which individual bags of bag assembly 70 are indexed out of container 72. The belt 80 moves in the direction of arrow 84 to index the bag assembly 70 toward a packing belt 86. The packing belt 86 also has paired hole engaging pins 82 which indexes an individual bag 100 before a packing machine 88. The packing machine, for example, can be a mark 50 machine such as made by AM&F which has been modified for operation with the belts 80 and 86. Thus, the individual bag 100 in front of packing machine 88 would be blown open by air pressure while held by pins 82 in holes 24 and 26. The loaf of bread, or other product, is then inserted within the bag.

Preferably, the packing belt 86 would accelerate slightly faster than the supply belt 80 after the bag 100 has been packed by machine 88 to tear the packed bag from the next adjacent unpacked bag at the line of perforations 50 therebetween. The packing belt 86 can then transfer the packed bag 100 further in the direction of arrow 84 to a end closing machine 90, which can be operated to either apply a conventional wire or plastic tie or even to heat seal the open end of bag 100 for tamper evident sealing of the bag. The bag 100 can then be transferred along the packing belt 86 to a secondary label applying machine 92, if desired, for applying additional labels. Finally, the packed and sealed bag 100 can be taken off the packing belt 86 to a facility for transfer to the final point of sale.

By providing an assembly of bags 70 in a continuous chain, the prior problem of one holers can be eliminated. The assembly 70 is fed into the packing machine by paired engaging pins which insure proper orientation of the individual bags 100 for packing by the packing machine 88. Furthermore, the engaged holes of the individual packed bags 100 can be used to orient the packed bag 100 before other machines, such as an end sealing machine 90 and the labeling machine 92. Thus, the present invention has significant advantages over the prior art in increased efficiency and reducing labor requirements.

Furthermore, the use of a bag assembly 70 can increase the speed of bread packaging by employing two or more mark 50 units. Each mark 50 unit is capable of packaging about 50 loaves of bread per minute. Thus, increasing the efficiency of packaging is generally only possible when one increments the efficiency by at least doubling the rate, so that a second mark 50 machine can be employed. The use of the bag assembly 70 can be employed to do so by speeding up the supply belts 80 and 86 to position bags before two or more individual mark 50 machines.

While one embodiment of the present invention has been described in detail herein and shown in the accompanying drawings, it will be evident that further modifications or substitutions or parts and elements are possible without departing from the scope and spirit of the invention.

I claim:

1. An improved method for manufacturing a bag from a sheet, comprising the steps of:
    (a) folding the sheet longitudinally off the center line of the sheet to define facing bag portions and a flap portion;
    (b) forming a pair of holes through the flap portion;
    (c) bonding the facing bag portions of the sheet together transverse the longitudinal direction of the sheet at uniform spacing along the sheet to form individual bags with side seals;
    (d) perforating the sheet between the side seals of adjacent bags;
    (e) indexing the individual bags with indexing structure extending through the pair of holes in the flap portion of each bag to a loading machine for loading each bag with a product; and
    (f) accelerating the indexing structure indexing each bag relative to the adjacent bag to separate the bags along the line of perforations.

2. The improved method of claim 1 further comprising the step of:
    indexing the individual loaded bag with indexing structure extending through the pair of holes in the flap portion of each bag to an end closing machine for closing the open end of the bag.

3. The improved method of claim 2 further comprising the step of forming a heat seal to close the open end of each bag with the end closing machine.

4. The improved method of claim 2 further comprising the step of tying the open end of the bag closed with a wire or tie with the end closing machine.

5. The improved method of claim 1 further comprising the step of indexing the individual bags with indexing structure extending through the pair of holes in the flap portion of each bag to a label applying machine for applying a label to each bag.

6. An improved indexing machine for indexing bags in a bag assembly for packing the bag assembly formed of bags secured side by side with a line of perforations between each bag, each bag having a flap portion with paired holes, comprising:
    means defining a pair of projections for engaging the paired holes in each of the bags for orienting an individual bag before a packing machine for packing;
    means for accelerating an individual bag relative to an adjacent bag for separating the bags along the line of perforations.

7. The improved indexing machine of claim 6 further comprising means defining a pair of projections for engaging the paired holes in each of the packed bags for orienting the individual packed bag before an end closing machine.

8. The improved indexing machine of claim 7 further comprising means mounted on the end closing machine for tying the open end of an individual bag closed by a wire or tie.

9. The improved indexing machine of claim 7 further comprising means mounted on the end closing machine for forming a heat seal to close the open end of the packed bag.

10. The improved indexing machine of claim 6 further comprising means defining a pair of projections for engaging the paired holes in each of the bags for orienting an individual bag before a label applying machine.

11. An improved method for manufacturing bags from a sheet, the bags for use with a product bagging machine using the bags in the form of a wicket, the wicket having a plurality of bags stacked on a U-shaped piece, each bag having a flap with a pair of holes for receiving the legs of the U-shaped piece to hold the bag on the wicket, the product bagging machine causing the top bag of the wicket to open for insertion of a product while on the wicket, the position of the U-shaped piece orienting the bag for insertion of the product and requiring the bags to be torn off the wicket piece once packed to expose the next bag to be packed, said improved method to eliminate the labor and expense of wicketing individual bags on a wicket and thereby avoid the presence of one-holers and wicket accessories, comprising the steps of;

(a) folding the sheet longitudinally off the center line of the sheet to define facing bag portions and a flap portion;

(b) bonding the facing bag portions of the sheet together transverse the longitudinal direction of the sheet at uniform spacing along the sheet to form individual bags with side seals;

(c) forming a pair of holes through the flap portion of each bag;

(d) perforating the sheet between the side seals of adjacent bags, the method of manufacturing thereby forming a continuous length of connected bags;

(e) positioning individual bags in the continuous length of connected bags for insertion of the product by positioning the length of bags with orienting structure passing through selected holes in the flaps of the bags to align the bags; and (f) forming a tamper evident heat seal on each formed bag after packaging, the bags being oriented for heat sealing by pin structure passing through selected ones of the holes in the flaps of the bags.

12. An improved method for manufacturing bags from a sheet, the bags for use with a product bagging machine using the bags in the form of a wicket, the wicket having a plurality of bags stacked on a U-shaped piece, each bag having a flap with a pair of holes for receiving the legs of the U-shaped piece to hold the bag on the wicket, the product bagging machine causing the top bag of the wicket to open for insertion of a product while on the wicket, the position of the U-shaped piece orienting the bag for insertion of the product and requiring the bag to be torn off the wicket piece once packed to expose the next bag to be packed, said improved method to eliminate the labor and expense of wicketing individual bags on a wicket and thereby avoid the presence of one-holers and wicket accessories, comprising the steps of:

(a) folding the sheet longitudinally off the center line of the sheet to define facing bag portions and a flap portion;

(b) bonding the facing bag portions of the sheet together transverse the longitudinal direction of the sheet at uniform spacing along the sheet to form individual bags with side seals;

(c) forming a pair of holes thorugh the flap portion of each bag;

(d) perforating the sheet between the side seals of adjacent bags, the method of manufacturing thereby forming a continuous length of connected bags;

(e) positioning individual bags in the continuous length of connected bags for insertion of the product by positioning the length of bags with orienting structure passing through selected holes in the flaps of the bags to align the bags; and (f) accelerating the structure orienting the first bag in the length relative to the remaining bags in the length to separate the first bag from the length along the line of perforation therebetween.

* * * * *